US009695272B2

(12) United States Patent
Carter et al.

(10) Patent No.: US 9,695,272 B2
(45) Date of Patent: *Jul. 4, 2017

(54) DIVINYLARENE DIOXIDE RESIN COMPOSITIONS

(75) Inventors: James Wells Carter, Pearland, TX (US); Maurice J. Marks, Lake Jackson, TX (US); Ludovic Valette, Lake Jackson, TX (US); Gyongyi Gulyas, Lake Jackson, TX (US)

(73) Assignee: BLUE CUBE IP LLC, Midland, MI (US)

( * ) Notice: Subject to any disclaimer, the term of this patent is extended or adjusted under 35 U.S.C. 154(b) by 542 days.

This patent is subject to a terminal disclaimer.

(21) Appl. No.: 13/169,358

(22) Filed: Jun. 27, 2011

(65) Prior Publication Data
US 2011/0319515 A1 Dec. 29, 2011

Related U.S. Application Data

(60) Provisional application No. 61/359,099, filed on Jun. 28, 2010.

(51) Int. Cl.
*C08G 59/22* (2006.01)
*C08G 59/24* (2006.01)
*C08G 59/68* (2006.01)
*C08G 65/18* (2006.01)
*C09D 11/101* (2014.01)
*C09D 11/322* (2014.01)

(52) U.S. Cl.
CPC .......... *C08G 59/22* (2013.01); *C08G 59/245* (2013.01); *C08G 59/68* (2013.01); *C08G 65/18* (2013.01); *C09D 11/101* (2013.01); *C09D 11/322* (2013.01)

(58) Field of Classification Search
USPC ................................................ 522/168, 170
See application file for complete search history.

(56) References Cited

U.S. PATENT DOCUMENTS

| 3,117,099 | A | 1/1964 | Proops et al. |
| 4,058,400 | A | 11/1977 | Crivello |
| 4,058,401 | A | 11/1977 | Crivello |
| 4,105,806 | A | 8/1978 | Watt |
| 4,138,255 | A | 2/1979 | Crivello |
| 4,161,478 | A | 7/1979 | Crivello |
| 4,173,476 | A | 11/1979 | Smith et al. |
| 4,175,972 | A | 11/1979 | Crivello |
| 4,186,108 | A | 1/1980 | Carlson et al. |
| 4,197,174 | A | 4/1980 | Chang |
| 4,201,640 | A | 5/1980 | Watt |
| 4,218,531 | A | 8/1980 | Carlson |
| 4,231,951 | A | 11/1980 | Smith et al. |
| 4,247,472 | A | 1/1981 | Watt |
| 4,247,473 | A | 1/1981 | Chang |
| 4,273,668 | A | 6/1981 | Crivello |
| 5,962,547 | A | 10/1999 | Nikolic et al. |
| 7,101,998 | B2 | 9/2006 | Herlihy et al. |
| 7,294,723 | B2 | 11/2007 | Herlihy et al. |
| 7,309,122 | B2 | 12/2007 | Atsushi et al. |
| 7,335,782 | B2 | 2/2008 | Herlihy et al. |
| 7,598,401 | B2 | 10/2009 | Herlihy et al. |
| 7,671,081 | B2 | 3/2010 | Herlihy et al. |
| 2007/0004819 | A1 | 1/2007 | Lu et al. |
| 2007/0066698 | A1 | 3/2007 | Yang et al. |
| 2008/0081917 | A1 | 4/2008 | Herlihy et al. |
| 2008/0268169 | A1 | 10/2008 | Standing et al. |
| 2009/0023829 | A1 | 1/2009 | Herlihy et al. |

FOREIGN PATENT DOCUMENTS

| EP | 878472 A1 * | 11/1998 |
| JP | H09-151237 | 6/1997 |
| JP | H11-071364 | 9/2000 |
| JP | 2004-504427 | 2/2004 |
| JP | 2007-191567 | 8/2007 |
| JP | 2008-544067 | 12/2008 |
| JP | 2010-202880 | 9/2010 |
| TW | 201211015 | 3/2012 |
| WO | 96/13538 A2 | 5/1996 |
| WO | 2005044890 | 5/2005 |
| WO | 2010/101144 | 9/2010 |
| WO | 2012/009118 A2 | 1/2012 |

OTHER PUBLICATIONS

"Color Basics", No. L7-158, X-Rite Inc., Grandville, MI, May 2005.
A.J. Taggi and P. Walker, Printing Processes, Kirk-Othmer Encyclopedia of Chemical Technology, pp. 1-59, John Wiley & Sons, Inc., Apr. 12, 2000.
Jaffe E. E., Organic Pigments, Kirk-Othmer Encyclopedia of Chemical Technology, pp. 1-52, John Wiley & Sons, Inc., Jan. 16, 2004.
Pham, H. Q. and Marks, M.J., Epoxy Resins, Kirk-Othmer Encyclopedia of Chemical Technology, pp. 1-94, John Wiley & Sons, Inc., Apr. 12, 2004.
Taylor, Barry N. and Thompson, Ambler, The International System of Units (Si), The National Institute of Standards and Technology (NIST) in NIST Special Publication 330, 8th Edition, pp. 95-142, 2006.
U.S. Appl. No. 61/141,457, filed Dec. 30, 2008, Marks et al.
Swiler, Daniel R., Inorganic Pigments, Kirk-Othmer Encyclopedia of Chemical Technology, pp. 1-37, John Wiley & Sons, Inc., Aug. 19, 2005.

(Continued)

Primary Examiner — Sanza McClendon
(74) Attorney, Agent, or Firm — Polsinelli PC

(57) ABSTRACT

A curable divinylarene dioxide resin composition including (a) at least one divinylarene dioxide, (b) at least one cationic photoinitiator, and (c) optionally, at least one pigment material; a process for making the curable divinylarene dioxide resin composition; and a cured divinylarene dioxide resin composition made therefrom. The cured product made from the above curable divinylarene dioxide resin composition offers improved properties and are useful for various applications including ink formulations.

17 Claims, No Drawings

(56) References Cited

OTHER PUBLICATIONS

International Search Report for PCT/US2011/041543 dated Feb. 1, 2012, 4 pages.
Written Opinion for PCT/US2011/041543 dated Feb. 1, 2012, 5 pages.
Office Action, Taiwan Patent Application No. 100122396; Curable Resin Compositions, Dow Chemical Company, Apr. 27, 2015, 11 pages.
Office Action, Japanese Patent Application No. 2013-518488, Dow Chemical Company, dated Nov. 21, 2014, 13 pages.
Office Action, Japanese Patent Application No. 2013-518488, Dow Chemical Company, dated Jun. 5, 2015, 7 pages.
Office Action, Chinese Patent Application No. 201180038981.3, Dow Global Technologies LLC, dated Sep. 21, 2015, 11 pages.

* cited by examiner

DIVINYLARENE DIOXIDE RESIN COMPOSITIONS

CROSS-REFERENCE TO RELATED APPLICATIONS

This application claims the benefit of U.S. Provisional Application No. 61/359,099 filed Jun. 28, 2010.

BACKGROUND OF THE INVENTION

Field of the Invention

The present invention relates to curable epoxy resin compositions; and more specifically; to ultraviolet light (UV) curable divinylarene dioxide resin compositions; and UV cured products prepared from such curable divinylarene dioxide resin compositions. The curable divinylarene dioxide resin compositions of the present invention are advantageously useful in, for example, UV curable ink formulations.

Description of Background and Related Art

Radiation- or thermally-initiated, cationically-curable epoxide monomers and compositions are disclosed in U.S. Pat. No. 5,962,547 (herein "the '547 patent"). In particular, cationically-curable epoxides described in the '547 patent are compounds containing a styrene oxide monomer. The '547 patent also describes that the cationically-curable epoxide compounds are useful in adhesive and coating formulations. For example, a UV-curable epoxide adhesive formulation includes (i) a cationic photoinitiator; (ii) an alcohol or polyol; and (iii) the styrene oxide monomer as the epoxide component.

A problem encountered with certain styrene oxide monomers described in the '547 patent is poor stability with respect to hydrolysis. Significant amounts of water are frequently incorporated into curable UV ink formulations unintentionally by exposure to the atmosphere and as a contaminant in formulation components. Subsequent hydrolysis of the epoxy monomer in the formulation produces glycol groups and has adverse affects on formulation processability and cured ink properties.

Also, prior art processes for curing UV ink formulation suffer from several disadvantages including low speed UV processing, high viscosity, and odor associated with UV processing. In other words, the prior art processes do not disclose the combination of high speed UV processing, low odor, and good adhesion to substrates.

Accordingly, there is still a need in the industry to provide a photocationically-curable epoxy resin having good hydrolytic stability with (1) high speed UV processing and (2) low odor UV processing.

SUMMARY OF THE INVENTION

The present invention comprises a composition containing a hydrolytically stable divinylarene dioxide (DVADO), a cationic photoinitiator, and other optional ingredients that are responsive to actinic radiation. Actinic radiation includes for example electromagnetic or light emits spectrum of mercury; electronic beams; UV lamps and the like. The National Institute of Standards and Technology (NIST) in "The International System of Units (SI)" NIST Special Publication 330, 2008 Ed., eds. Taylor, Barry N. and Thompson, Ambler, defines actinic radiation as radiation capable of causing chemical changes in living or non-living materials.

One embodiment of the present invention is directed to a photocationically-curable divinylarene dioxide resin composition comprising (a) at least one divinylarene dioxide having good hydrolytic stability, (b) at least one cationic photoinitiator, and (c) optionally, at least one pigment material.

Another aspect of the present invention is directed to a process for preparing the photocationically-curable divinylarene dioxide resin composition.

Still another aspect of the present invention is directed to an ink formulation derived from the above photocationically-curable divinylarene dioxide resin compositions.

DETAILED DESCRIPTION OF THE INVENTION

In its broadest scope, the present invention includes a photocationically-curable divinylarene dioxide resin composition comprising (a) at least one divinylarene dioxide such as for example a divinylbenzene dioxide (DVBDO), (b) at least one cationic photoinitiator such as for example Cyracure UVI-6992 available from The Dow Chemical Company, and optionally (c) at least one pigment material such as for example an organic pigment or an inorganic pigment. An example of an organic pigment is copper phthalocyanine blue pigment and an example of an inorganic pigment is titanium dioxide which is a white pigment. The resulting photocationically-curable divinylarene dioxide resin composition or formulation of the present invention may also optionally include one or more optional additives well known in the art.

The formulations of the present invention may be used to prepare UV curable ink formulations therefrom. For example, in one embodiment, the present invention is directed to providing a cationic UV curable composition that includes several benefits over known UV compositions including for example wherein the present invention composition: (1) has high speed UV processing, (2) has a low odor associated with UV processing, (3) has a low viscosity, and (4) contains a hydrolytically stable divinylarene dioxide compound.

The present invention provides a photocationically-curable epoxy resin derived from divinylarene dioxides which solves the problems of the prior processes and compositions. In some aspects, the present invention, directed to a photocationically-curable epoxy resin containing DVADO, provides an advantage including for example, the advantage of high speed UV processing wherein "high speed" UV processing is meant that the compositions are UV curable at rates useful to produce an acceptable cured article by UV processes. The UV process speed of UV curable printing inks is commonly defined as the speed at which the ink film resists without visible damage the force of an applied cotton ball or an applied thumb twist to the ink film 0.1 to 5 seconds after the ink film has been UV processed.

High speed UV processing leads to several other advantages using the present invention composition including for example: High speed UV processing (a) enables the use of lower amounts of photoinitiator (e.g. less than about 4 weight percent photoinitiator solids in an ink formulation); and (b) enables a higher productivity of curd product such as an ink product (e.g. more than 10 percent (%) faster for example if the closest art blue ink composition has a UV processing speed of 24.4 meter per minute [80 feet/min.] than an improved blue ink composition would have a UV processing speed of 26.8 meter per minute [88 feet/min]) Higher productivity associated with UV processing in a manufacturing operation also reduces the costs per unit.

Conventional cycloaliphatic epoxides such as ERL4221™ epoxy resin, conventional aromatic epoxy resins such as D.E.R.™ 331 epoxy resin, and conventional epoxidized vegetable oils such as FLEXOL™ Plasticizer EPO suffer from relatively slow cationic UV processing speed because of the nature of the epoxy functionality in each example. Cycloaliphatic epoxides that contain ester functionality in the structure similar to ERL4221 show a slower UV processing speed than compounds that do not contain the ester functionality for example. Aromatic glycidyl ether epoxy resins such as D.E.R. 331 show a slower UV processing speed than cycloaliphatic epoxy resins such as for example ERL4221. Epoxy vegetable oils like FLEXOL EPO show a slower UV processing speed than aromatic glycidyl ether epoxy resins such as for example DER 331.

Low odor UV processing is defined as an ink film that does not have an odor 0.1 to 5 seconds after the ink film has been UV processed; and, wherein the UV curable resin is useful in ink formulations. The low odor is associated with better quality of the cured article. Conventional UV compositions containing conventional epoxy and mixed triaryl sulfonium salt compounds are known to have a sulfur odor during and after UV processing.

The low viscosity enables high pigment and filler loading of the UV compositions. In turn, high pigment and filler loading increases the color density and improves the quality of packaging printing ink UV compositions for example.

The viscosity of DER 331 is typically from about 9,000 mPa·s to about 12,000 mPa·s at 25° C. This viscosity is relatively high for UV compositions that are applied and UV processed at temperatures near 25° C. The viscosity of ERL4221 is from about 350 mPa·s to about 450 mPa·s at 25° C. UV processing is a high speed process and therefore the coating composition must be capable of being applied using conventional methods like roll coating and flow out to give a smooth film before UV process because UV processing effectively "freezes" the coating in its place.

By "hydrolytic stability" with reference to an epoxy compound herein means an epoxy compound that does not react in the presence of water to exhibit a significant reduction in the amount of epoxy functionality. A significant reduction in the amount of epoxy functionality is indicated by the loss of about 5% or more of the epoxy functionality. Therefore, the hydrolytic stability of a divinylarene dioxide resin is such that upon exposure to water at room temperature (about 20° C.) and after 4 hours, the composition retains about 70%, preferably about 80%, more preferably about 90% of its original epoxy concentration.

Hydrolytically unstable materials present handling and shipping challenges. Hydrolytically unstable materials have to be manufactured and handled using controls designed to minimize moisture contamination. Adding hydrophilic materials for example polyols to cationic UV compositions containing epoxy compounds is often practiced to improve the flexibility and depth of UV cure of the film. However, the use of hydrophilic materials like polyols may bring or attract moisture into UV compositions. In general, the moisture may hydrolyze and reduce the concentration of the epoxide functionality of certain epoxy resins which in turn reduces the coating quality.

The use of a divinylarene dioxide such as DVBDO in a cationic UV curable composition is found to provide the above-mentioned benefits of high speed UV processing, low odor associated with UV processing, and low viscosity versus conventional epoxide materials. In addition, it has been unexpectedly found that the hydrolytic stability of a divinylarene dioxide such as DVBDO versus other known dioxides such as 1,3-diisopropenylbenzene dioxide (DIPBDO) is significantly improved. As is known by the skilled artisan, special and expensive measures required for the formulating, handling, shipping, and processing of hydrolytically unstable compounds.

One main objective of the present invention is provide UV compositions containing DVADO which exhibit fast UV processing, low odor and good hydrolytic stability. UV compositions containing DVADO may or may not include added polyol or pigment or filler or any combination the three depending on the end use requirements. The primary application of the DVADO compositions of this invention is expected to be in UV-cured compositions including coatings, inks, rapid prototypes, adhesives, and encapsulants.

In addition, the photocationically-curable divinylarene dioxide resin composition comprising the divinylarene dioxides advantageously provide novel resins having high heat resistance and good environmental resistance.

The divinylarene dioxides useful in the present invention, particularly those derived from divinylbenzene such as for example DVBDO, are class of diepoxides which have a relatively low liquid viscosity but impart higher heat resistance and rigidity in its derived cured compositions than do conventional epoxy resins. The epoxide group in divinylarene dioxides is significantly less reactive than that in conventional glycidyl ethers used to prepare prior art hydrolyzed epoxy resins.

The divinylarene dioxide useful in the present invention may comprise, for example, any substituted or unsubstituted arene nucleus bearing two vinyl groups in any ring position. The arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthalene, tetrahydronaphthalene, and the like. Homologously bonded (substituted) benzenes may consist of biphenyl, diphenylether, and the like.

The divinylarene dioxide such as DVBDO used in the UV composition of the present invention may be prepared by reacting a divinylarene and hydrogen peroxide to provide the divinylarene dioxide useful in epoxy resin compositions of the present invention. Such prepared divinylarene dioxide may be used to prepare the hydrolyzed divinylarene dioxide resin of the present invention. In one embodiment, the divinylarene dioxide used in the present invention may be produced, for example, by the process described in U.S. patent application Ser. No. 61/141,457, filed Dec. 30, 2008, by Marks et al., incorporated herein by reference.

The divinylarene dioxide used for preparing the composition of the present invention may be illustrated generally by general chemical Structures II-V as follows:

Structure II

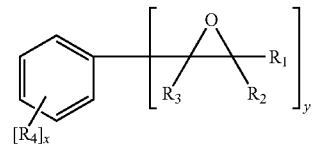

Structure III

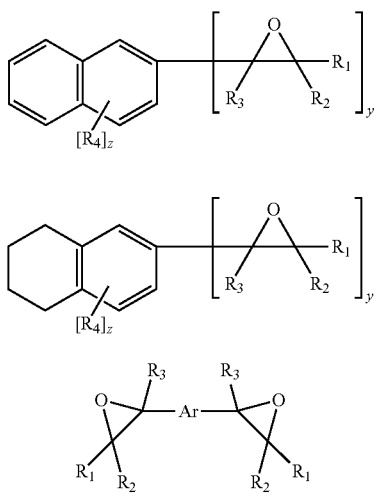

Structure IV

Structure V

In the above Structures II, III, IV and V of the divinylarene dioxide comonomer of the present invention, each $R_1$, $R_2$, and $R_4$ individually may be hydrogen, an alkyl, cycloalkyl, an aryl or an aralkyl group; or a $H_2O_2$-resistant group including for example a halogen, a nitro, or an RO group, wherein R may be an alkyl, aryl or aralkyl; $R_3$ is hydrogen; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

The divinylarene dioxide component useful in the present invention may include for example divinylbenzene dioxide, divinylnaphthalene dioxide, divinylbiphenyl dioxide, divinyldiphenylether dioxide, and mixtures thereof.

Structure VI below illustrates an embodiment of a preferred chemical structure of the DVBDO useful in the present invention:

Structure VI

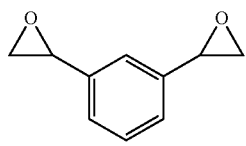

Structure VII below illustrates another embodiment of a preferred chemical structure of the DVBDO useful in the present invention:

Structure VII

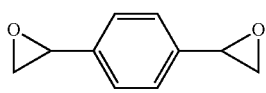

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) and para isomers of DVBDO, respectively. The ortho isomer is rare; and usually DVBDO is mostly produced as an about 2:1 ratio of meta (Structure VI) to para (Structure VII). Thus, the present invention preferably includes as one embodiment an about 2:1 ratio of Structure VI to Structure VII.

In another embodiment of the present invention, the divinylarene dioxide may contain quantities (such as for example less than about 20 weight percent) of substituted arenes. The amount and structure of the substituted arenes depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight of the divinylarene dioxide to a value greater than that of the pure compound.

In one embodiment, the divinylarene dioxide, for example DVBDO, useful in the present invention comprises a low viscosity liquid epoxy resin (LER) composition. The viscosity of the divinylarene dioxide used in the process for making the epoxy resin composition of the present invention ranges generally from about 2 mPa-s to about 100 mPa-s, preferably from about 2 mPa-s to about 50 mPa-s, and more preferably from about 4 mPa-s to about 25 mPa-s at 25° C.

One of the advantageous properties of the divinylarene dioxides useful in the present invention is their thermal stability which allows their use in formulations or processing at moderate temperatures (for example, at from about 100° C. to about 200° C.) for up to several hours (for example, for at least 2 hours) without oligomerization or homopolymerization. Oligomerization or homopolymerization during formulation or processing is evident by a substantial increase in viscosity or gelling (crosslinking). The divinylarene dioxides useful in the present invention have sufficient thermal stability such that the divinylarene dioxides do not experience a substantial increase in viscosity or gelling during formulation or processing at moderate temperatures.

Another advantageous property of the divinylarene dioxide useful in the present invention may be for example its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from about 6 to about 10, preferably from about 6 to about 9, and more preferably from about 6 to about 8 rotational degrees of freedom.

The concentration of the divinylarene dioxide used to prepare the divinylarene dioxide resin composition of the present invention may range generally from about 1 weight percent (wt %) to about 99.95 wt % of the reactive resin portion of the composition, preferably from about 2 wt % to about 80 wt %; and more preferably, from about 2 wt % to about 50 wt %. Below these concentrations the desired high speed UV processing may not be realized. Above these concentrations, higher ink costs may be incurred without significantly increasing the speed at which the ink can be UV processed.

One preferred embodiment of the divinylarene dioxide used to prepare, for example, a UV ink formulation of the present invention include meta- and para-DVBDO and mixtures thereof; meta- and para-ethylvinylbenzene oxide (EVBO) and mixtures thereof; and optional ingredients that include meta- and para-divinylbenzene monoxide (DVBMO) and mixtures thereof; and additional optional ingredients that include oligomers.

In one embodiment, the DVBDO used can be a crude DVBDO, i.e. a DVBDO wherein DVBDO is less than 100% purity when manufactured. For example, a DVBDO that can be used herein includes a DVBDO product containing at least 55% DVBDO and greater, preferably 80% and more preferably 95%.

One preferred embodiment of the divinylarene dioxide used to prepare the ink formulations of the present invention can be characterized by having a viscosity of from about 2 mPa-s to about 100 mPa-s, preferably from about 3 mPa-s to about 50 mPa-s, more preferably from about 4 mPa-s to about 25 mPa-s, and most preferably from about 4 mPa-s to about 15 mPa-s at 25° C.

The photoinitiator, component (b), useful in preparing the curable divinylarene dioxide resin composition of the present invention may be any conventional photoinitiator compounds. For example, the photoinitiator compound useful in the practice of the present invention may include Cyracure UVI6992 and UVI6976 available from The Dow Chemical Company and mixtures thereof. Mixtures of any two or more photoinitiators can also be used in the practice of the present invention. Other suitable photoinitiator compounds useful in the present invention are described in U.S. Pat. Nos. 4,105,806; 4,197,174; 4,201,640; 4,247,472; 4,247,473; 4,161,478; 4,058,400; 4,058,401; 4,138,255; 4,175,972; 4,273,668; 4,173,476; 4,186,108; 4,218,531; and 4,231,951; incorporated herein by reference.

Photoinitiators that may be used herein may be solutions that contain a photoinitiator or a mixture of photoinitiators and a suitable carrier, or may be 100% solids. Both the solution types and the 100% solid types of photoinitiators and mixtures thereof may be used in the present invention.

Suitable carriers for photoinitiators of the solution type are compounds that are useful for preparing liquid solutions that contain photoinitiators. Examples of photoinitiators that are solutions are UVI-6992 and UVI-6976 available from The Dow Chemical Company. In the case of UVI-6992 and UVI-6976 the carrier is propylene carbonate. Another example of a photoinitiator that is a solution is triarylsulfonium PF6 benzene free photoinitiator also known as R-Gen BF 1172 available from Chitec and related compounds. In the case of R-Gen BF 1172 the carrier is propylene carbonate.

Examples of photoinitiators of the 100% solid type that are useful in the present invention include [4-(octyloxy)phenyl]phenyliodonium hexafluorophospate also known as FP5384; (4-methoxyphenyl)phenyliodonium trifluormethanesulfonate, i.e., triflate also known as FP5311; bis(4-tertiary-butylphenyl)iodonium hexafluoroantimonate also known as FP5034; cyclohexyltosylate also known as FP5102; (4-methyl-4-(trichloromethyl)-2,5-cyclohexadienone also known as FP5510 available from Hampford Research Inc. Stratford, Conn. and related compounds; and mixtures thereof; and diphenyliodonium PF6 available from Sigma-Aldrich, Milwaukee, Wis. and related compounds and mixtures thereof.

Other examples of a photoinitiator that is 100% solids include (4-methylphenyl)(4'-isobutylphenyl)iodonium hexafluorophospate also known as Irgacure 250 available from Ciba Specialty Chemicals and related compounds; diarylferrocinium salt hexafluorophospate also known as R-Gen 261; triphenyl-sulfonium SbF6 also known as Chivacure 548 available from Chitec Technology Company Limited, Taipei City, Taiwan, Republic of China (Chitec) and related compounds; and mixtures thereof.

Some preferred examples of the photoinitiator compounds useful in the present invention may include for example compounds that contain diphenyl-(phenylthiophenyl)sulfonium cation; bis[4-(diphenylsulfonio)phenyl]sulfide bis cation; triphenylsulfonium cation; [4-(octyloxy)phenyl]phenyliodonium cation; (4-methoxy-phenyl)phenyliodonium cation; bis(4-tertiary-butylphenyl)iodonium cation; (4-methylphenyl)(4'-isobutylphenyl)iodonium cation; hexafluoroantimonate ($SbF_6^-$) anion, $SbF_x(OH)_y$,— where x+y=6 anion; hexafluorophosphate ($PF_6^-$) anion; tetrafluoroborate ($BF_4^-$) anion; tetrakis(pentafluorophenyl)borate anion; and mixtures thereof.

Other preferred embodiments of photoiniators useful in the present invention are disclosed in U.S. Pat. Nos. 7,671,081; 7,598,401; 7,335,782; 7,294,723; and 7,101,998; and U.S. Patent Application Publication Nos. 20080081917A1, 20080268169A1, and 20090023829A1. Yet other preferred embodiments of the photoiniators useful in the present invention are disclosed in U.S. Pat. Nos. 7,671,081; 7,598,401; 7,335,782; 7,294,723; and 7,101,998.

Some of the most preferred embodiments of the photoinitiators useful in the present invention contain diphenyl(phenylthiophenyl)sulfonium; bis[4-(diphenylsulfonio)phenyl]sulfide; $SbF_6^-$; $SbF_x(OH)_y$,— where x+y=6; $PF_6^-$; and photoinitiators disclosed in U.S. Pat. Nos. 7,671,081; 7,598,401; 7,335,782; 7,294,723; and 7,101,998; and mixtures thereof.

The concentration of the photoinitiator solids used to prepare the curable divinylarene dioxide resin composition of the present invention may range generally from about 0.05 wt % to about 20 wt %; preferably, from about 0.1 wt % to about 15 wt %; and more preferably, from about 0.2 wt % to about 10 wt % of the total composition. Below these concentrations the desired high speed UV processing may not be realized. Above these concentrations, higher ink costs may be incurred without significantly increasing the speed at which the ink can be UV processed.

In addition, above these concentrations there can be odor during and after UV processing that is attributed to compounds that result from the photo-decomposition or photolysis of the photoinitiator. In the case of some triarylsulfonium salts for example Cyracure UVI6992 the odor can be an objectionable sulfur odor. In the case of some diarylsulfonium salts for example diphenyliodonium PF6 the odor can be an iodine odor.

In preparing the curable divinylarene dioxide resin composition of the present invention, at least one pigment may be used in the divinylarene dioxide composition, particularly for preparing ink formulations.

Pigments that are useful in the ink formulations of the present invention include for example, inorganic and organic pigments, fillers, and mixtures thereof. For example, the pigments described in the following references are useful in the present invention: *The Printing Ink Manual*, Leach, R. H. and Pierce, R. J. Eds.; Kluwer Academic Publishers Boston, 1993 and in the references therein; Jaffe, E. E. Organic Pigments, in the Kirk-Othmer Encyclopedia of Chemical Technology; John Wiley & Sons, Inc.: online Jan. 16, 2004 and the references therein; and Swiler, D. R. Inorganic Pigments. In ibid: online 19 Aug., 2005 and the references therein.

In a preferred embodiment, a suitable pigment employed in the practice of the present invention may include, for example, one or more of the following: carbon black, iron oxide, titanium dioxide, phthalocyanine blue, red pigment, yellow pigment, green pigment, and mixtures thereof.

In a preferred embodiment, a suitable pigment employed in the practice of the present invention includes, for example, a pigment having a pH of generally from about 4 to about 11, preferably from about 4.5 to about 10, more preferably, from about 5 to about 9, and most preferably from about 6 to about 8. In another embodiment, the pH of the pigment is generally less than about 11, more preferably less than about 10, most preferably less than about 9, and even more preferably less than about 8. In yet another embodiment, the pH of the pigment is generally greater than about 4, preferably greater than about 4.5, more preferably greater than about 5, and even more preferably greater than about 6.

In an alternative embodiment, the pigment pH may be adjusted to the above ranges by treating the pigment with an additive to provide the appropriate pH. For example, if the pigment is acidic, a basic neutralizing agent may be used. If the pigment is basic, an acidic neutralizing agent may be used. Basic neutralizing agents include for example any compound that has the desired neutralizing effect without contributing detrimental effects to the formulation or the cured product made therefrom. For example, basic neutralizing agent may include tertiary amines, quaternary ammonium hydroxides, quaternary phosphonium hydroxides, alkali hydroxides and carbonates and alkaline earth hydroxides, carbonates, and oxides, and mixtures thereof. N-Alkyldialkanolamines such as N-ethyldiethanolamine is one example of a preferred neutralizing agent.

Acidic neutralizing agents include for example any compound that has the desired neutralizing effect without contributing detrimental effects to the formulation or the cured product made therefrom. Acid neutralizing agents include for example organic and inorganic acids, such as for example glacial acetic acid, benzene sulfonic acid, and phosphoric acid, and mixtures thereof.

The effect of using pigments that have pH less than about 4 in ink formulations of the present invention can be that the ink can gel or solidify in the container for example in the can rendering the ink useless before the ink can be used because the divinylarene oxide compound is highly reactive and will polymerize in the presence of acids, acidic compounds, and compounds that can function like acids. The effect of the polymerization of the divinylarene oxide compound in the presence of acids, acid compounds, and compounds that function like acids is the ink viscosity will increase greatly and the ink will form a solid that cannot be used as the ink was intended to be used.

Pigments that have pH less than about 4 can be used in the ink formulations of the present invention when appropriate steps are taken to neutralize and render ineffective the pigment as a source of polymer formation because of polymerization of the divinylarene oxide component of the ink formulation of the present invention.

The effect of using pigments that have pH more than about 11 in ink formulations of the present invention can be that the ink can have slower than expected cure because the pH of the pigment has the effect of neutralizing or rendering less active the photocationic catalyst that is formed when the cationic photoinitiator is activated by actinic radiation for example during UV processing.

The pH of a pigment can be readily measured by preparing a dispersion or a suspension of the pigment in neutral water and measuring the pH of the water using a conventional method accepted in the art, for example, using a pH meter.

The pigment is generally employed in an amount of from about 1 wt % to about 90 wt %; preferably from about 1 wt % to about 80 wt %; more preferably from about 2 wt % to about 70 wt %; and most preferably from about 3 wt % to about 60 wt % wherein the weight percent is based on the combined weight of the composition. Below these concentrations the ink may not have sufficient color strength. Above these concentrations the ink may not have the desired rheology for printing—for example, the ink may have a viscosity that is too high to be applied using the intended printing process for example an ink that has a viscosity greater than about 100 mPa-s at 25° C. would be difficult to successfully print using common inkjet printing technology available today without taking measures to reduce the ink viscosity during jetting. The desired ink rheology can depend on the printing process employed. Above these concentrations, higher ink costs may be incurred without significantly increasing the color strength of the ink.

The color or hue of pigments is a critical reason why specific pigments are chosen to be used in ink compositions. The color of pigments is directly related to the chemical composition of pigments for example the chemical composition commonly called copper phthalocyanine is commonly used to produce blue pigments. The color of pigments and the concentration of pigments used in ink compositions are two critical factors that directly impact the color of the printed ink. The concentration of the pigment used in an ink composition directly affects the color strength or color density of the ink composition.

Methods have been developed to describe and quantify color including ink color. One method commonly used in the printing industry to describe and quantify ink color is described in the document titled "Color Basics", number L7-158 (05/05) available from X-Rite Inc., Grandville, Mich. In "Color Basics" from X-Rite three important dimensions of color are described: (1) lightness or color value, and sometimes called luminance, which is related to how bright the ink appears; (2) chroma or saturation which is the color's intensity; and (3) hue which is the name associated with the color for example blue or red. Ink lightness or color value lies on a continuous scale of shades of gray with white and black located at each end of the scale according to the document "Color Basics".

Instruments are available to measure color of printed inks. Spectro-photometers for example the Series 500 offered by X-Rite Inc. are one important class of instruments commonly used in the printing ink industry to measure the color of printed inks for the purposes of communicating efficiently color data, product development, quality control including color matching.

Color matching is the art of matching and communicating the color of inks. Standardized color systems are commonly employed to improve color matching from one printing run to another, from one printing house to another, from one substrate to another, and from one geography to another for example. The proprietary Pantone color matching system offered by Pantone Inc., Carlstadt, N.J. now owned by X-Rite Inc. is an example of a color matching system commonly use by the printing industry. Color matching is important for brand identification especially in a global market where printing inks may be produced and printed using different printing processes onto different substrates for example a metal drink can and a plastic packaging film.

In preparing the curable divinylarene dioxide resin composition of the present invention, at least one alcohol or polyol may be used in the divinylarene dioxide composition. The alcohol or polyol useful in the present invention may include for example polyester polyols including those prepared using dibasic acids and polyols including diols and triols; and polycaprolactone diols and triols and mixtures thereof; and polyether polyols including those containing ethylene glycol and propylene glycol and mixtures thereof including Voranol™ polyols from The Dow Chemical Company; and glycols for example ethylene glycol, propylene glycol, butylene glycol, hexylene glycol, and mixtures thereof; and diethylene glycol, triethylene glycol, and higher molecular weight analogs, dipropylene glycol, and tripropylene glycol, and higher molecular weight analogs, and mixtures thereof; and 1,4-cyclohexanedimethanol and 1,3-cyclohexanedimethanol, and mixtures thereof; and trimethylolpropane, 2-methyl-1,3-propanediol, neopentylglycol, pentaerythritol, and glycerine, and mixtures thereof; and ethoxylated and/or propoxylated derivatives of any of these examples; and polyester polyols prepared using dibasic acids and any of the polyols herein described; and mixtures thereof.

The alcohol or polyol, when used in the ink formulations of the present invention, is generally employed in an amount 1 wt % to 70 wt %, more preferably 1 wt % to 30 wt %, more preferably 1 wt % to 20 wt %, and most preferably 1 wt % to 10 wt % based on the total of the epoxide and the polyol components of the composition.

In one preferred embodiments, the ink formulations of the present invention contain no added alcohols or polyols.

Additional optional reactive components of the ink formulations of the present invention may include epoxides. Optional epoxides are described by Pham, H. Q. and Marks, M. J. *Epoxy Resins*. In the Kirk-Othmer Encyclopedia of Chemical Technology; John Wiley & Sons, Inc.: online Dec. 4, 2004 and in the references therein; Lee, H. and Neville, K. *Handbook of Epoxy Resins*, McGraw-Hill: New York, 1967 and in the references therein; May, C. A. Ed. *Epoxy Resins: Chemistry and Technology*, Marcel Dekker Inc.: New York, 1988 and in the references therein; and in U.S. Pat. No. 3,117,099; all which are incorporated herein by reference.

In one preferred embodiment, the optional epoxide can be a fluid, a semi-solid, or a solid at 25° C.; most preferably a fluid at 25° C. The optional epoxide has a viscosity, in general, of less than about 50,000 mPa-s, preferably less than about 25,000 mPa-s, and more preferably less than about 15,000 mPa-s at 25° C.

Suitable optional epoxides useful in the present invention include for example, epoxy products such as for example those sold under the trademark D.E.R.™ commercially available from The Dow Chemical Company; and cycloaliphatic epoxides such as for example Celloxide 2021, 2021A, and 2021P commercially available from Daicel.

Other suitable optional epoxides include for example Vikolox epoxide products from Atochem; and glycidyl esters for example hexahydrophthalic anhydride diglycidyl ester.

Still other suitable optional epoxides include epoxy reactive diluents for example C12-C14 alkyl glycidyl ether also known as Epoxide 8, ortho-cresylglycidyl ether, 1,4-butanediol diglycidyl ether, 1,6-hexanediol diglycidyl ether, trimethylol-propane triglycidyl ether, 2-ethylhexylglycidyl ether, and versatic acid glycidyl ester also known as Glydexx N10 from Exxon-Mobil; and mixtures thereof.

Yet other suitable optional epoxides include vegetable oil epoxides such as for example linseed oil and soybean oil epoxides. Examples of such vegetable oils can be Flexol LOE and Flexol EPO commercially available from The Dow Chemical Company.

Other embodiments of optional epoxides useful in the present invention include limonene dioxide, vinylcyclohexene monoxide and vinylcyclohexene dioxide, styrene oxide. Still other embodiments of the optional epoxides include organic compounds that have the epoxide functionality at the terminal end of a polymer chain.

One preferred embodiment of a useful optional epoxide includes those epoxides that contribute to the desired ink properties including but not limited to fast UV cure, desired ink rheology, low ink misting or sling during printing, low viscosity, good color strength, low odor, low cost, low shrinkage during cure, good adhesion, good flexibility, good chemical and water resistance, resistance to yellowing, good outdoor weathering, low toxicity, and minimal environmental impact during manufacture and during disposal.

"Low misting" or "ink sling" with reference to an ink herein means that when the ink is being applied using a printing process for example a roller printing process, a direct roller printing process, or an off-set roller printing process the ink will resist forming a mist or being slung undesirably from the rolls that are spinning or turning at high speed and are involved ink printing application process.

U.S. Pat. No. 7,309,122, for example, discloses epoxy compounds, vinyl ether compounds, and oxetane compounds that are photocationically polymerizable compounds that are useful optional reactive components of the ink formulations of the present invention.

Other optional reactive components of the formulations of the present invention may include oxetanes, which are four-membered cyclic ethers. Optional oxetanes may include for example 3-ethyl-3-hydroxy(methyl)oxetane also known as trimethylolpropane oxetane and available as OXT-101 from Toagosei and available as TMPTO from Perstorp. Other optional oxetanes include the following examples available from Toagosei: 1,4-bis[(3-ethyl-oxetanylmethoxy)methyl]benzene also known as OXT-121; 3-ethyl-3-phenoxymethyloxetane also known as OXT-211; bis{[1-ethyl(3-oxetanyl)]-methyl}ether also known as OXT-221; and 3-ethyl-3-[(2-ethyl-hexyloxy)methyl]oxetane also known as OXT-212; and OXT-610 silyloxetane.

The oxetane may be present in the curable divinylarene dioxide resin composition at a concentration of generally from 0 to about 50 wt %, preferably from about 0.01 wt % to about 50 wt %, and more preferably from about 0.1 wt % to about 50 wt % of the total composition.

Other optional reactive components of the formulations of the present invention may include acrylated materials such as for example tripropylene glycol diacrylate, trimethylolpropane triacrylate, neopentylglycol diacrylate, pentaerythritol tetra-acrylate, dipentaerythritol hexa-acrylate, ethoxylated acrylates, propoxylated acrylates, mixed ethoxylated and propoxylated acrylates, epoxy acrylates, urethane acrylates, polyester acrylates, and a host of acrylate compounds including monomers, oligomers, and polymers available from Sartomer, from Cytec for example under the trade names Ebecryl and Ucecoat, from Toagosei for example under the trade name Aronix, and acrylates available from others. A free-radical photoinitiator is an optional ingredient when the ink formulations of the present invention contain an acrylate compound.

The acrylate may be present in the curable divinylarene dioxide resin composition at a concentration of generally from 0 to about 99 wt %, preferably from about 0.01 wt % to about 98 wt %, and more preferably from about 0.01 wt % to about 97 wt % of the total composition.

Surfactants may optionally be used in the curable divinylarene dioxide resin composition of the present invention such as for example polysiloxane type surfactants, fluorinated surfactants, acrylic copolymers, or mixtures thereof.

The surfactant may be present in the curable divinylarene dioxide resin composition at a concentration of generally from 0 to about 2 wt %, preferably from about 0.01 wt % to about 2 wt %, and more preferably from about 0.01 wt % to about 1 wt % of the total composition.

Pigment dispersants may optionally be used in the curable divinylarene dioxide resin composition of the present invention such as for example polysiloxanes, fluorinated components, copolymers including comb copolymers and branched copolymers, organic salts for example naphthalene sulfonates including those that contain a zinc cation, or mixtures thereof.

The pigment dispersant may be present in the curable divinylarene dioxide resin composition at a concentration of generally from 0 to about 2 wt %, preferably from about 0.01 wt % to about 2 wt %, and more preferably from about 0.01 wt % to about 1 wt % of the total composition.

Additives known useful for the preparation, storage, and curing of resin compositions may be used as optional additional components in the curable divinylarene dioxide resin composition of the present invention including for example, other resins such as aromatic glycidylether epoxides; oxetane compounds; other onium salts photoinitiators including diaryliodonium salts; stabilizers; fillers; plasticizers; catalyst de-activators; and mixtures thereof.

The curable divinylarene dioxide resin composition of the present invention may optionally contain one or more other additives which are useful for their intended uses. For example, the optional additives useful in the present invention composition may include, but not limited to stabilizers; surfactants such as silicones; flow modifiers; dyes; matting agents; degassing agents; flame retardants (e.g., inorganic flame retardants, halogenated flame retardants, and non-halogenated flame retardants such as phosphorus-containing materials); toughening agents such as elastomers and liquid block copolymers; curing initiators; curing inhibitors; wetting agents; colorants; thermoplastics; processing aids; fluorescent compounds; UV stabilizers; inert fillers such as clay, talc, silica, and calcium carbonate; fibrous reinforcements; fibers such as fiberglass and carbon fiber; antioxidants; impact modifiers including thermoplastic particles; solvents such as ethers and alcohols; and mixtures thereof. The above list is intended to be exemplary and not limiting. The preferred additives for the formulation of the present invention may be optimized by the skilled artisan.

The concentration of the additional additives is generally between 0 wt % to about 90 wt %; preferably, between about 0.01 wt % to about 80 wt %; more preferably, between about 1 wt % to about 65 wt %; and most preferably, between about 10 wt % to about 50 wt % based on the weight of the total composition.

The preparation of the curable divinylarene dioxide resin composition of the present invention is achieved by admixing (a) at least one divinylarene dioxide having good hydrolytic stability, and (b) at least one cationic photoinitiator; and (c) optionally, at least one pigment material.

Typically, in one embodiment, the pigment and the divinylarene dioxide and other optional components are mixed together using a process that sufficiently disperses the pigment to the desired fineness of grind and the photoinitiator; and then the other optional ingredients are added afterward. When optional pigment dispersants and degassing agents are employed, these components may be added to the pigment and the divinylarene oxide prior to dispersing the pigment.

Typically, in one embodiment, the divinylarene dioxide component is added to the mixing equipment first followed by the addition of optional ingredients including pigment dispersants, surfactants, and degassing agents, and then followed by the addition of the pigment.

Processes that may be used to disperse the pigment in the divinylarene dioxide and the other optional components include but are not limited to three-roll mills, sand mills, media mills, ball mills, horizontal mills, vertical mills, and Cowles high-speed dispersers.

Any of the above-mentioned optional assorted formulation additives, for example fillers, may also be added to the composition during the mixing or prior to the mixing to form the composition of the present invention.

All the components of the curable divinylarene dioxide resin composition are typically mixed and dispersed at a temperature enabling the preparation of an effective curable divinylarene dioxide resin composition having a low viscosity for the desired application. The temperature during the mixing of all components may be generally from about 0° C. to about 100° C. and preferably from about 20° C. to about 50° C.

The curable divinylarene dioxide resin composition of the present invention, prepared from the divinylarene dioxides described above, exhibit improved heat resistance at the same molecular weight or lower viscosity at the same heat resistance compared to known compositions in the art.

The viscosity of the curable divinylarene dioxide resin composition prepared by the process of the present invention is a viscosity in a range that is desirable to print the ink composition of the present invention using the desired printing process. For example inks that are printed using an inkjet printing process are desirably from about 1 mPa-s to about 200 mPa-s, more preferably from about 1 mPa-s to about 100 mPa-s, more preferably from about 1 mPa-s to about 50 mPa-s, and most preferably from about 1 mPa-s to about 25 mPa-s at 25° C. Inks that are printed using a gravure printing process are desirably from about 10 mPa-s to about 500 mPa-s, more preferably from about 50 mPa-s to about 200 mPa-s, and most preferably from about 50 mPa-s to about 150 mPa-s at 25° C. Inks that are printed using a flexographic printing process are desirably from about 50 mPa-s to about 5000 mPa-s, more preferably from about 100 mPa-s to about 1000 mPa-s, and most preferably from about 100 mPa-s to about 800 mPa-s at 25° C. Inks that are printed using a screen printing process are desirably from about 500 mPa-s to about 50,000 mPa-s, more preferably from about 1000 mPa-s to about 25,000 mPa-s, and most preferably from about 5000 mPa-s to about 25,000 mPa-s at 25° C.

The UV processing speed of the curable divinylarene dioxide resin composition prepared by the process of the present invention is a UV processing speed in a range that is desirable for UV processing the ink formulation/composition of the present invention using the desired printing process. For example it is desirable to UV process inks at a speed more than 1% faster than the comparative ink compositions and preferably 5% faster and more preferably more than 10% faster where the UV process speed is defined as the speed at which the ink film resists without visible damage the force of a thumb twist applied to the ink film 0.1 to 5 seconds after UV processing and more preferably about 2 seconds after UV processing.

During and after UV processing, it is desirable for the curable divinylarene dioxide resin composition prepared by the process of the present invention not to have a detectable odor as detected by the human nose after completion of the UV processing such as for UV processing of the ink formulation/composition of the present invention using the desired printing process. Generally, the cured product of the present invention does not have a strong odor as detectable by the human nose for any extended period of time after UV processing in one embodiment; the cured product of the present invention has no odor to a mild odor as detectable by the human nose after UV processing in another embodiment; and the cured product of the present invention has no odor as detectable by the human nose after UV processing in still another embodiment. In some embodiment, the curable divinylarene dioxide resin composition may have a detectable odor for a short period of time after UV processing. For example, generally the odor of the curable divinylarene dioxide resin composition of the present invention is odor free as detectable by the human nose after UV processing after from about 0.1 second to about 5 seconds in one embodiment, and from about 0.1 second to about 2 seconds in another embodiment, for example, after the ink film has been UV processed.

Another embodiment of the present invention is directed to ink formulations derived from the above present invention photocationically-curable divinylarene dioxide resin compositions that are printed using printing processes.

Printing processes that are useful for printing the ink formulations of the present invention include but are not limited to printing processes described in "The Printing Ink Manual", R. H. Leach and R. J. Pierce (ed.) fifth edition 1993, Kluwer Academic Publishers and in the references therein; and in chapter "Printing Processes" by A. J. Taggi and P. Walker in the Kirk-Othmer Encyclopedia of Chemical Technology, published by John Wiley & Sons, Inc online 4 Dec., 2000 and the references therein; all of which are incorporated herein by reference.

Printing processes that are useful for printing the ink formulations of the present invention include but are not limited to inkjet, gravure, screen, flexography, lithography, stereo lithography, rapid prototyping, heat transfer printing, direct printing, and off-set printing processes. Stereolithography and rapid prototyping processes are used to UV process films that are typically about 25-microns (1-mil) and greater which typically requires more UV per area (mJ/cm2) or a more efficient photoinitiator or both as compared to printing processes for example like flexography that are used to UV process films that are typically 1-2 microns thick.

Examples of inkjet printing processes that are useful for printing the ink formulations of the present invention include but are not limited to continuous, drop-on-demand, and piezoelectric.

Examples of flexography printing processes that are useful for printing the ink formulations of the present invention include but are not limited to in-line and central impression.

Screen printing processes that are useful for printing the ink formulations of the present invention include but are not limited to rotary screen and in-line screen printing.

Examples of useful gravure printing processes that are useful for printing the inks of the present invention include direct gravure, off set gravure, and rotogravure.

Examples of useful lithographic printing processes that are useful for printing the inks of the present invention include direct lithography, off set lithography, roto-lithography, and sheet fed lithography.

The substrates that may be printed using the ink formulations of the present invention include metal, plastic, cellulosic, and textile.

Metal includes for example materials that contain iron, carbon, copper, aluminum, manganese, cobalt, zirconium, lead, zinc, tin, vanadium, and magnesium, and alloys that contain any number of these metals, including for example brass and bronze.

Metals that contain iron include steel which includes mild steel, cold rolled steel, hot rolled steel, stainless steel, tin-plated steel, electrolytically tin-plated steel, tin-free steel, and treated steel which includes steel that has a tin oxide coating, a chromium oxide coating, a zinc phosphate coating, and more than one of any of these treatments in combination, and treatments applied to steel using any number of processes including cathodic deposition. Metals that contain iron and carbon include carbon steel. Copper includes copper foil, plate, and wire and including copper that has been applied to a printed circuit board. Copper alloys include brass and bronze. Aluminum includes pure aluminum and useful alloys that contain aluminum. Cellulosic includes wood and paper products.

The curable formulation or composition of the present invention can be cured under conventional processing conditions to form a cured product. The resulting cured product displays excellent balance of thermo-mechanical properties, such as good toughness, mechanical strength, adhesion, flexibility, color, while maintaining high thermal stability and hydrolytic stability, and chemical resistance.

The curing reaction conditions include, for example, curing using actinic radiation including UV radiation, visible light, and electron beams. UV lamps typically contain a high purity quartz envelop or tube. UV lamps include medium pressure and high pressure mercury vapor lamps including lamps containing optional additives including iron halide and gallium halide and mixtures thereof. UV lamps include lamps that contain xenon chloride.

The UV lamps may be powered using electrodes attached to each end of the lamp or using microwaves that impinge onto the quartz envelop of an electrodeless lamp. Electric arcs and microwaves are use to power the UV lamps and cause mercury to form a plasma and mercury plasma is known to emit radiation. Microwave powered lamps include the UV lamps offered by Fusion UV Systems, Inc. The power level required to operate UV lamps are typically described by the watts (W) per linear length of the lamp for example 40, 80, 120, 160, 200, 240 and 300 W/cm. Typically, higher power lamps can process inks and coatings at higher speeds which improves productivity however higher power lamps require more energy to operate and are typically more expensive.

UV lamps typically emit visible light and UV and infrared (IR) radiation. The IR can be managed using water or forced air to cool the lamp or the lamp and the substrate. Reflectors are typically used to direct and focus as desired more of the useful energy emitted by the lamp onto the ink on substrate. Reflectors include elliptical and parabolic reflectors. Dichroic reflectors may be used to direct and focus as desired more of the useful energy and to absorb some of the IR.

Electron beams (EB) include high energy electron beams emitted from an appropriate filament and accelerated toward the substrate. Electron beam processing equipment includes products available from Advanced Electron Beams, Wilmington, Mass. The ink formulations of the present invention may be processed using electron beams.

UV and EB curing of the ink formulations of the present invention may be carried from less than 1 second to 120 seconds, preferably from less than 1 second to 30 seconds, and most preferably less than 1 second.

The compositions of the present invention can be useful in rapid prototype applications which are optically dense materials because of the film thickness that is required to be cured using an appropriate LASER. Faster UV LASER processing will provide in improved productivity or enable the use of lower photoinitiator concentrations or both.

The curing process of the present invention may be a batch or a continuous process. The reactor used in the process may be any reactor and ancillary equipment well known to those skilled in the art.

The cured product prepared by curing curable divinylarene dioxide resin composition of the present invention advantageously exhibits an improved balance of thermomechanical properties (e.g. glass transition temperature ($T_g$), modulus, and adhesion). The cured product can be visually transparent or opalescent. Compared to analogous cured products prepared using only prior art epoxy resins, the cured compositions prepared using the epoxy resins of the present invention have a higher $T_g$ (10%-100%) and higher tensile modulus (10%-100%).

The heat resistance of the cured compositions of the present invention ranges generally from about 50° C. to about 300° C.; preferably, from about 75° C. to about 275° C.; and more preferably, from about 100° C. to about 250° C. as measured by $T_g$ using differential scanning calorimetry (DSC).

The cured product of the present invention has no odor that is detectable by the human nose 0.1 to 5 seconds after UV processing and preferably 2 seconds after the ink film has been UV processed; and, wherein the UV curable resin is useful in ink formulations.

The cured product of the present invention has adhesion to a wide variety of plastics and preferably the cure production has adhesion to treated polyethylene film where adhesion is measured by the crinkle adhesion test method and by the cellophane tape test method described in "Flexography: Principles and Practices" (1992), 4$^{th}$ edition edited and published by the Foundation of Flexographic Technical Association, Inc., Ronkonkoma, N.Y., page 355.

The curable divinylarene dioxide resin compositions of the present invention are useful for photocationic cure compositions including inks, rapid prototype, coatings, adhesives, and encapsulating compositions.

More particularly, the curable divinylarene dioxide resin compositions of the present invention are useful for the preparation of ink formulations. As an illustration of the present invention, in general, the curable divinylarene dioxide resin compositions may be useful in ink formulations that are applied in the following areas:

Products made using steel include food cans including soup, tuna, and vegetable cans, and beverage cans including beer and beverage cans, can ends including easy-open can ends, metal crowns for glass bottles.

Products made using aluminum including beverage cans, food cans, can ends including easy-open can ends, automobile parts including automotive bodies and wheel covers, aircraft, and marine vessels.

Products made using aluminum include foil which includes lidding used for pharmaceutical packaging including blister packaging and food products including yogurt cups, foil used to wrap molten cheese products, and foil applied to glass bottles to protect the cork for example for wine bottles; and metalized plastic.

Plastic includes polyolefins including polyethylene and polypropylene, copolymers including block copolymers and random copolymers, high density polyolefin, medium density polyolefin, low density polyolefin, polyvinyl chloride, polyethylene terephthalate also known as PET and also known at polyester, polyamide also known as nylon, polycarbonate, polyimide, thermoplastic resins, and thermoset resins including for example but not limited to epoxy resins, amino resins, and phenolic resins.

Plastic include composites that contain themoplastic resin or thermoset resin; and can contain glass including glass fiber and glass cloth; carbon including carbon fiber; and nano-sized particles including but not limited to nano-silica, nano-graphite, and nano-carbon.

Products made using plastic include packaging films for example bread bags, frozen food bags, microwavable food bags, aseptic packaging used for food, films used to package meats, cheese, and dairy products; pharmaceuticals; electronics; plastic liners used to pack cereal boxes; and shrink films including shrink labels used to label metal and plastic bottles including bottles used to package beverages, foods, and non-food products including fluid products; and flooring products including sheet and tile goods. All of these are printed using the ink formulations of the present invention.

Many packaging products contain multiple layers and may be considered composite materials for example the various layers may contain plastic including plastic film, metal including aluminum foil and plastic film with a layer of metalized aluminum, and paper. All of these are printed using the ink formulations of the present invention.

Products made using plastics included blow molded plastics and injection molded plastics. Products made using plastics include packaging used for food, non-food products, pharmaceuticals, and electronics. All of these are printed using the ink formulations of the present invention.

Packaging products made using plastic include bottles including beverage containers, milk bottles, drink containers including water and sports drinks, fruit beverages, carbonated beverages, yogurt drinks; ketchup bottles; lids for plastic and metal bottles; and non-food products including anti-freeze fluid, wind shield wiper fluid, and brake and hydraulic fluid products; storage containers; housings including housings for machines including business machines including computers, printers, and cell phones; and compact discs (CDs) and digital video discs (DVDs); parts used inside automobiles for example the dash board, steering column and steering wheel, air bags, and trim; and parts used on the outside of automobiles including rear view minor housings, headlamps, headlamp lenses, and trim; parts used under the hood which includes for example rubber and plastic hose, housings, and parts; and sheathing material used to protect wire and cable; and electronic packaging including for example resistors and capacitors including those used for printed circuit board manufacture. All of these are printed using the ink formulations of the present invention.

Products made using composites include products used in the electronics industry including printed circuit boards, products used in the energy industry including wind mill blades used for producing electricity and composite pipe used for transporting oil and gas and ethanol, products used in the transportation industry including automobile bodies and parts, aircraft bodies and parts, and marine vessels including boat hulls, and products used in the construction industry including bath tubs, and shower stalls. All of these are printed using the ink formulations of the present invention.

The inks of the present invention include inks are used to print radio-frequency identification (RFID); bar codes; electronic circuits; and identifying markings.

Cellulosic products that are printed using ink formulations of the present invention include flooring, kitchen cabinets, and furniture; and packaging including labels for packaging;

and corrugated paper and paperboard used for boxes for packaging; including food and non-food products; and aseptic packaging used for food and pharmaceutical products.

Bamboo products are printed using the ink formulations of the present invention including but not limited to flooring and textiles.

Products printed using an inkjet printing process to print the ink formulations of the present invention include but are not limited to textiles; containers; and signage and banners, including those used for point-of-purchase displays; and substrates that are printed include but are not limited to textiles, corrugated polypropylene, polypropylene, polyethylene, polyolefin copolymer, vinyl, polyamide also known as nylon, and polyester.

Products printed using a screen printing process to print the ink formulations of the present invention include but are not limited to textiles; containers; and signage and banners, including those used for point-of-purchase displays; and substrates that are printed include but are not limited to textiles, corrugated polypropylene, polypropylene, polyethylene, polyolefin copolymer, vinyl, polyamide also known as nylon, and polyester.

Textiles are printed using ink formulations of the present invention. Textiles are manufactured using thread. The types of thread used to make textiles include but are not limited to cotton, synthetic polymer, wool, cellulose, modified cellulose, and bamboo. Products made using textiles include clothing; packaging; and products used for building and construction. All of these are examples that are printed using ink formulations of the present invention.

Products printed using a gravure printing process to print the ink formulations of the present invention include but are not limited to lottery tickets, magazines, and packaging; and the substrates that are printed include but are not limited to plastic film and paper.

Products printed using lithography using the inks of the present invention include but are not limited to metal containers for example beverage containers and beverage containers made using plastic film that has been laminated onto metal.

EXAMPLES

The following examples and comparative examples further illustrate the present invention in detail but are not to be construed to limit the scope thereof.

The following analytical methods were employed in the Examples:

Gas chromatography (GC) was done using a HP6890 series gas chromatograph fitted with a RTX-5 Crossbond® 5% diphenyl/95% dimethyl-polysiloxane column (Restek) and a flame ionization detector and a temperature ramp of 60° C. to 250° C. at 10° C./minute.

Gas chromatography/mass spectrometry (GC/MS) was done using a Gas chromatography/mass spectrometry (GC/MS) analyses were performed using a Thermo DSQ GC/MS system fitted with electron ionization (EI) and chemical ionization (CI) compontes and a Agilent J&W DB-5MS, 0.25 mm×30 m, 0.25 μm film column and a temperature ramp of 35° C. to 300° C. at 5° C./minute. The detector was a Thermo DSQ mass spectrometer using isobutane as the CI reagent.

Gas chromatography/electrospray ionization (GC/ESI) was done using a Waters/Micromass LCT Premier XE time-of-flight mass spectrometer on a solution of the sample in methanol. The methanol solution was directly infused into the ESI probe at 5 μL per minute. Analyses were performed in positive ESI mode.

Preparation of DIPBDO and DVBDO

DIPBDO and DVBDO were prepared from diisopropenylbenzene (DIPB) and divinylbenzene (DVB), respectively, using the procedure described in U.S. Patent Application Ser. No. 61/141,457 entitled "Process for Preparing Divinylarene Dioxides," filed Dec. 30, 2008 by Marks et al.

Preparation and Purification of DIPBDO

DIPB (20 g, 126 mmol, from Sigma-Aldrich Co.), 3-MP (2.08 g, 25.3 mmol) and MTO (0.32 g, 1.26 mmol) were dissolved in 200 mL dichloromethane and stirred at 600 revolutions per minute (rpm) in the reaction kettle. Hydrogen peroxide (31%, 54.45 g, 253 mmol) was added drop wise in the course of 30 minutes and the temperature was kept around 25° C. by cooling the jacketed kettle. The resultant reaction mixture was further incubated at 25° C. for 4 hours after which complete conversion of DIPB to DIPBDO was observed by GC analysis. Stirring was stopped and the resulting aqueous and organic phases were separated. The organic phase was washed using sodium thiosulfate solution (0.25 M, 3 times) followed by water. Then sodium sulfate was added to the wet dichloromethane solution and the mixture was held overnight at about 20° C. to about 24° C.

Upon standing overnight the wet DIPBDO solution formed a precipitated solid which was removed by filtration. The precipitate was identified as di-hydrolyzed DIPBDO by GC/ESI analysis. DIPBDO was recovered in 80% yield, showing it had lost 40% of its original epoxy content. The crude product was distilled under vacuum and collected between 123-127° C. at 2.3 mmHg. The distilled DIPBDO was analyzed by GC and GC/MS analyses.

The washed and dried organic phase that contained DVBDO was stable under the conditions described for the DIPBDO experiment. There was no indication of hydrolysis in the organic phase that contained DVBDO.

Determination of Viscosity

Viscosity was measured using a Stabinger SVM3000-G2 viscometer operated at about 23° C.

The chemicals used in the Examples included the following:

DVBDO has an epoxide equivalent weight (EEW) of about 81 g/equivalent. TONE™ 0301 is a poly(caprolactone) triol having a hydroxyl equivalent weight of about 100 g/hydroxyl equivalents and CYRACURE™ UVR6105 and CYRACURE™ UVR 6110 cycloaliphatic epoxide having an EEW of about 132 and 138 g/equivalent, respectively, were obtained from The Dow Chemical Company. MP-diol, 2-methyl-1,3-propanediol, was obtained from Lyondell Chemical Company. CYRACURE UVI6992 is a cationic photoinitiator solution containing about 45 wt % mixed triarylsulfonium PF6 salts in propylene carbonate solution was obtained from The Dow Chemical Company. Silwet L7604, a polydimethylsiloxane surfactant, was obtained from GE Silicones. Irgalite GLVO, a copper phthalocyanine blue pigment intended for printing ink applications, was obtained from BASF. Methylethylketone (MEK) was obtained from Sigma-Aldrich Chemical Co. Corona treated polyethylene film used for packaging applications was obtained from The Dow Chemical Company. Scotch™ #234 masking tape was obtained from 3M.

The equipment used in the Examples included the following:

Aluminum foil laminated paper cards, 7.62 cm×12.7 cm (3 inches×5 inches), from The Leneta Company, Inc.; phosphated-treated steel panels from Q-Panel Company; #2.5, #5 and #16 wire rod applicators from Paul N. Gardner Company, Inc.; model DRS-120 adjustable conveyor system equipped with conveyor speed control dial, Epiq brand model 6000 ultraviolet (UV) irradiator module, model P600 power supply for the UV irradiator, and a model H 600 W/in. electrodeless quartz UV lamp that emits radiation in the region 200 to 400 nm all from Fusion UV Systems Inc.; model 2100 digital tachometer and model 1017SP surface speed adapter used to measure conveyor speed from Herman H. Sticht Co.; model IL390B radiometer from International Light Technologies; model 11-661-8 digital hygrometer thermometer from Control Company; model DAC 150 FV SpeedMixer™, and 1 mm and 2 mm diameter glass beads from Flacktec; and a Fischerscope™ MMS™ Permascope dry film thickness instrument from Fischer Technology, Inc.

Examples 1-5 and Comparative Examples A-D

Examples 1 and 2 and Comparative Examples A and B were prepared by weighing the ingredients for each example indicated in Table I into a glass vial and manually mixing using a spatula. Example 3 and Example 4 were prepared by preparing a masterbatch that contained DVBDO and pigment. Comparative Example C was prepared by preparing a masterbatch that contained UVR6105 and pigment. Example 5 and Comparative Example D were prepared by weighing the ingredients for each example indicated in Table III into a glass vial and manually mixed using a spatula.

A typical masterbatch that was used to prepare Example 3 and Example 4 was prepared by weighing about 35 g DVBDO, about 15 g copper phthalocyanine blue pigment, about 15 g 1-mm glass beads, and about 15 g 2-mm glass beads into a plastic FlackTec container.

A typical masterbatch used to prepare Comparative Example C was prepared by weighing about 35 g UVR6105, about 15 g copper phthalocyanine blue pigment, about 15 g 1-mm glass beads, and about 15 g 2-mm glass beads into a plastic FlackTec container.

A FlackTec container that contained masterbatch ingredients was secured in a FlackTec SpeedMixer™ and was mixed for about 5 to 10 minutes using a speed of about 1500 to 3500 rpm.

The purpose of the glass beads was to disperse the pigment in the epoxy. The quality of the dispersion of the pigment for each masterbatch that was prepared was measured using a #65 fineness of grind gauge from Precision Gage and Tool, Co. The fineness of grind of each masterbatch was less than 0.5 mils. Each masterbatch was separated from the glass beads using a strainer.

Example 3, Example 4, and Comparative Example C were prepared by weighing the ingredients for each example indicated in Table II into a glass vial and manually mixing using a spatula and a shaker table.

About 1 to 2 mL aliquots of ink were transferred to aluminum foil cards or to steel panels as indicated for each UV processing speed measurement. Example 1, Example 2, and Comparative Example A were applied into films on the cards using a #5 wire rod. Example 3, Example 4, and Comparative Example B were applied into films on the cards using a #2.5 wire rod. Example 5 and Comparative Example D were applied into films on the steel panels using a #16 wire rod.

The UV processing speeds of Examples 1 through 4 and Comparative Examples A through C were measured using the experimental method of WO2005044890(A1).

Example 5 and Comparative Example D were dried using cumulative UV processes where the UV process speed that was used was about 16.2 meter per minute (53 feet/min) per UV process. Example 5 and Comparative Example D were tested once per UV process using the method of WO2005044890(A1). The cumulative number of UV processes were recorded that were needed to dry Example 5 and Comparative Example D using the method of WO2005044890(A1). The dry film thickness of Example 5 and Comparative Example D were measured using a Fischerscope MMS. The UV per area was measured at about 16.2 meter per minute (53 feet/min) using a radiometer using the method known in the industry. In the UV lab, the relative humidity was 42% and ambient air temperature near the conveyor was 78° F. (25.6° C.) while the sampled were being applied and UV processed.

TABLE I

UV Curable Clear Inks Containing DVBDO

|  | Example 1 | Example 2 | Comparative Example A | Comparative Example B |
|---|---|---|---|---|
| Components (g) | | | | |
| DVBDO | 11.868 | 18.984 | 0.0 | 0.0 |
| UVR6110 | 0.0 | 0.0 | 14.010 | 19.034 |
| TONE 0301 | 7.236 | 0.0 | 4.991 | 0.0 |
| UVI6992 | 0.798 | 0.790 | 0.803 | 0.798 |
| SilwetL7604 | 0.214 | 0.210 | 0.193 | 0.206 |
| Total | 20.117 | 19.984 | 19.997 | 20.038 |
| Properties | | | | |
| epoxy/hydroxyl equivalents | 2.022 | not applicable | 2.049 | not applicable |
| UV process speed, meter/min (feet/min) | 219 (720) | 229 (750) | 76.2 (250) | 15.2 (50) |
| odor | no odor | mild odor | strong odor | strong odor |

In Table I above, the UV curable clear ink that contained DVBDO and no added polyol (Example 2) had a UV process dry speed of 229 meter/minute (750 feet/minute) (this measurement was limited by the equipment used). The ink that contained DVBDO and added polyol (Example 1) had a UV process dry speed of 219 meter/minute (720 feet/minute). The results shown in Table I demonstrate that surprisingly compositions that contain DVBDO and no added polyol have a higher UV process dry speed than compositions that contain DVBDO and added polyol. The results in Table I also demonstrate that surprisingly compositions that contain DVBDO have a higher UV process dry speed than compositions that contain UVR6110.

TABLE II

UV Curable Blue Pigment Inks containing DVBDO

|  | Example 3 | Example 4 | Comparative Example C |
|---|---|---|---|
| Components (weight percent) | | | |
| DVBDO | 82.64 | 78.30 | 0.00 |
| UVR 6105 | 0.00 | 0.00 | 82.64 |
| Blue pigment | 11.57 | 11.57 | 11.57 |

TABLE II-continued

UV Curable Blue Pigment Inks containing DVBDO

|  | Example 3 | Example 4 | Comparative Example C |
|---|---|---|---|
| UVI6992 | 5.79 | 5.79 | 5.79 |
| MP-diol | 0.00 | 4.34 | 0.00 |
| Total | 100.00 | 100.00 | 100.00 |
| Properties |  |  |  |
| UV process speed, meter/min. (feet/min) | 42.7 (140) | 24.4 (80) | 21.3 (70) |
| Solvent resistance, MEK double rubs | 200 | 200 | not measured |
| Tape adhesion | 100% | 100% | 100% |

In the above Table II, the UV curable blue pigmented ink that contained DVBDO (Example 3) had a UV process dry speed of 42.7 meter/minute (140 feet/minute) as compared to the UV curable blue pigmented ink that contained DVBDO and added polyol (Example 4) which had a UV process dry speed of 24.4 meter/minute (80 feet/minute) and as compared to the UV curable blue pigmented ink that contained UVR6105 (Comparative Example B) which had a UV process dry speed of 21.3 meter/minute (70 feet/minute). These results demonstrate that surprisingly compositions that contain DVBDO and no added polyol have a higher UV processing speed than compositions that contain DVBDO and added polyol and compositions that contain UVR6105.

Examples 3 and 4 also had solvent resistance that was greater than 200 double rubs using methylethylketone (MEK) solvent. These results demonstrate that compositions that contain DVBDO and no added polyol and compositions that contain DVBDO and added polyol each have solvent resistance.

The DVBDO compositions in Tables I and II typically had no or very little odor after cure as measured by detectability of the human nose. For instance, Examples 2 and 3 containing no polyol did not give off any odor at all.

TABLE III

UV Curable Thick Film Containing DVBDO

|  | Example 5 | Comparative Example D |
|---|---|---|
| Components (g) |  |  |
| DVBDO | 20 |  |
| UVR6105 |  | 20 |
| UVI6992 | 0.4 | 0.4 |
| SilwetL7604 | 0.2 | 0.2 |
| Total | 20.6 | 20.6 |
| Properties |  |  |
| Dry film thickness, micron (mil) | 28.2(1.11) | 18.3(0.72) |
| UV per area per UV process, mJ/cm2 | 290 | 290 |
| UV processes required to dry the ink | 1 | 10 |
| Total UV per area required to dry the ink, mJ/cm2 | 290 | 2900 |

In the above Table III, the UV curable ink that was about 28.2 micron that contained DVBDO (Example 5) required 290 mJ/cm$^2$ UV per area to dry as compared to the UV curable ink that was 18.3 micron that contained UVR6105 (Comparative Example D) required 2900 mJ/cm$^2$ UV per area to dry or about ten times more UV. These results demonstrate surprisingly that compositions that contain DVBDO require much less UV per area to dry than compositions that contain UVR6105.

Example 6 Hydrolytic Stability Test of DVBDO and DIPBDO

DVBDO or DIPBDO (0.20 g) was dissolved in tetrahydrofuran (5 mL). Distilled water (2.00 g) was added to the resulting solution and then the solution was stirred at 20° C. temperature for 4 hours. After the 4 hour incubation, samples of the solution were titrated to determine the epoxide equivalent weight (EEW). EEW was determined by derivatizing the epoxides with excess of pyridinium chloride and measuring the unused pyridinium chloride with methanolic potassium hydroxide using potentiometric end point determination. The samples were analyzed in duplicate. The measured EEW values were used to calculate DVBDO and DIPBDO concentrations in weight percent. Then DVBDO and DIPBDO concentrations of the samples subjected to the tetrahydrofuran-water treatment above were compared to concentrations of DVBDO and DIPBDO samples that were not subjected to the tetrahydrofuran-water treatment. The results show that DVBDO concentration decreased by 8% (92% stability) while DIPBDO concentration decreased by 33% (67% stability).

The invention claimed is:

1. A UV curable composition comprising (a) at least one divinylarene dioxide having a hydrolytic stability of greater than about 70 percent, (b) at least one cationic photoinitiator, and (c) at least one pigment material.

2. The composition of claim 1, wherein the divinylarene dioxide is divinylbenzene dioxide.

3. The composition of claim 1, wherein the concentration of the divinylarene dioxide ranges from about 1 weight percent to about 99.95 weight percent based on the total weight of the composition.

4. The composition of claim 1, wherein the at least one cationic photoinitiator comprises diphenyl(phenylthiophenyl)sulfonium cation; bis[4-(diphenyl-sulfonio) phenyl]sulfide bis cation; triphenylsulfonium cation; hexafluoroantimonate (SbF$_6^-$) anion, SbF$_x$(OH)$_y$— where x +y =6 anion; hexafluorophosphate (PF$_6^-$) anion; and mixtures thereof.

5. The composition of claim 1, wherein the concentration of said at least one cationic photoinitiator ranges from about 0.05 weight percent to about 20 weight percent based on the total weight of the composition.

6. The composition of claim 1, wherein the divinylarene dioxide is selected from the group comprising one or more divinylbenzene dioxide, substituted divinylbenzene dioxide, divinylnaphthalene dioxide, divinylbiphenyl dioxide, divinyldiphenylether dioxide, and mixtures thereof.

7. The composition of claim 1, wherein the at least one pigment material comprises copper phthalocyanine blue pigment, titanium dioxide, and mixtures thereof.

8. The composition of claim 1, wherein the concentration of said at least one pigment material ranges from about 1 weight percent to about 80 weight percent based on the total weight of the composition.

9. The composition of claim 1, wherein the pH of the at least one pigment material comprises from about 4 to about 11.

10. The composition of claim 1, including at least one alcohol or polyol.

11. The composition of claim 1, including further at least one reactive diluent, a viscosity modifier, or mixtures thereof.

12. A UV curable composition comprising (a) at least one divinylarene dioxide having a hydrolytic stability of greater than about 70 percent, (b) at least one cationic photoinitiator, and (c) at least one oxetane.

13. A process for preparing a curable divinylarene dioxide resin composition comprising admixing (a) at least one divinylarene dioxide having a hydrolytic stability of greater than about 70 percent, (b) at least one cationic photoinitiator, and (c) at least one pigment material.

14. The process of claim 13, admixing further at least one reactive diluent, a viscosity modifier, or mixtures thereof.

15. A process for preparing a curable divinylarene dioxide resin composition comprising admixing (a) at least one divinylarene dioxide having a hydrolytic stability of greater than about 70 percent, (b) at least one cationic photoinitiator and (c) at least one oxetane.

16. A cured product from curing the composition of claim 1.

17. The composition of claim 1, including further at least one surfactant.

* * * * *